H. MURCH.
Mop-Head.
No. 2,957. Reissued June 2, 1868.
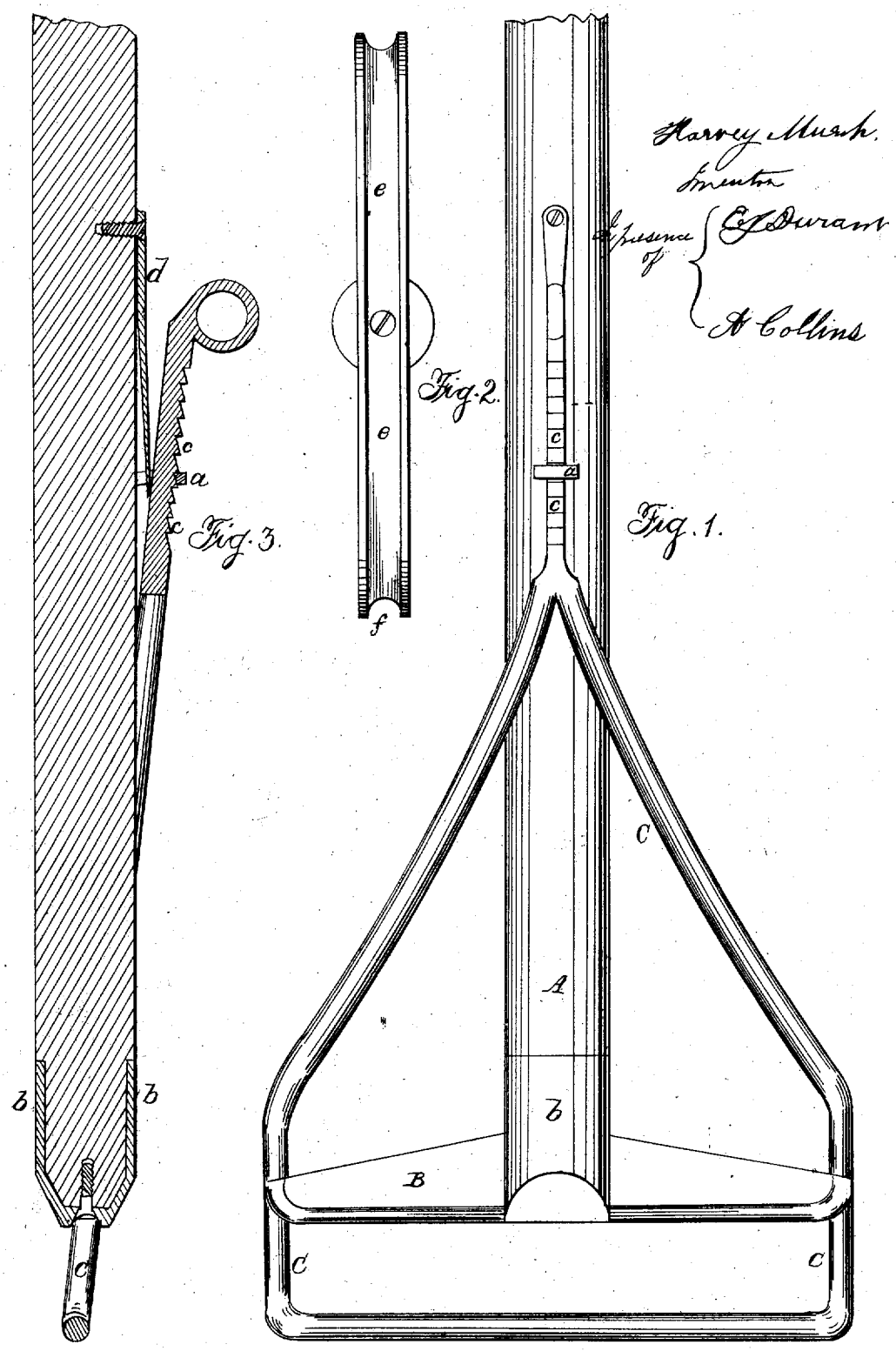
N. PETERS, PHOTO-LITHOGRAPHER, WASHINGTON, D. C.

United States Patent Office.

COLBY BROTHERS AND COMPANY, OF WATERBURY, VERMONT, ASSIGNEES, BY MESNE ASSIGNMENTS, OF HARVEY MURCH.

*Letters Patent No.* 9,781, *dated June* 14, 1853; *extended seven years; reissue No.* 2,957, *dated June* 2, 1868.

DIVISION A.

IMPROVED MOP-HEAD.

The Schedule referred to in these Letters Patent and making part of the same.

TO ALL WHOM IT MAY CONCERN:

Be it known that I, HARVEY MURCH, of Lebanon, in the county of Grafton, and State of New Hampshire, have invented a new and useful Improvement in Mop-Heads; and that the following, taken in connection with the accompanying drawings, is a full, clear, and exact description thereof.

In the drawings, which represent a mop-head and handle made according to the principles of my invention—

Figure 1 is a plan of the whole,

Figure 2 an end view of the cross-head, and

Figure 3 a longitudinal section through the whole contrivance.

Prior to the date of my invention, mop-heads were made in which the cross-head was secured to the handle, sometimes by a socket, making part of the cross-head, sometimes by a pin or rod making part of the cross-head, and entering into a hole in the handle; and mops having socketed cross-heads were provided with a binder, screwed at both ends, and having two nuts which bore upon the ends of the cross-heads. The other kind of cross-head was in some cases provided with a binder, whose ends were united together somewhat as shown in the drawings, but the united ends were, as far as I know, secured upon the pin or rod, and not upon the handle itself. My mop-head combines some of these old features, and has some new features.

In my mop-head the cross-head B is provided with a socket, *b*, (the whole made by preference in one piece,) driven upon and enclosing the end of the handle A. The attachment of the cross-head to the handle being thus strong and tolerably firm, much stronger than if a bolt or pin, attached to or making part of the cross-head, entered a hole in the handle.

This kind of cross-head, which I call a socketed cross-head, is, by preference, grooved at the two ends to guide and steady the binder at *f f*, and also longitudinally from end to end, as at *e*, (see fig. 2,) so as to gripe more firmly the rags, fibres, &c., of the mop.

The binder, shown at C C, has the two ends thereof united, so that a single fastening will hold the whole binder in place, compressing or clamping the rags, pieces of rope, fibre, &c., between it and the cross-head; and I prefer to secure the binder, not to the socket, but to the handle, for the reason that when so secured, those parts of the binder extending from the ends of the cross-head form, when the rags, &c., are compressed or clamped, braces or guys, extending from the cross-head to the handle, thereby aiding in holding or sustaining the cross-head in place, strengthening it to resist concussions during use, and if the socket should become loose, actually sustaining and bracing the cross-head firmly in place. If the united ends of the binder were secured to the socket, they would only strengthen the cross-head and not perform the other offices.

The end of the binder, shown in the drawings, is notched at *c c*, as there represented, and is pressed by a spring, *d*, against a staple-catch, *a*.

The object of the whole contrivance being to confine or secure the binder in such a position as to compress or clamp the rags, &c., to prevent the united ends thereof from moving laterally or crosswise of the handle to any great extent, and to permit of motion, when desired, in the direction of the length of the handle, so that rags, fibres, &c., constituting the mop, may be clamped and unclamped.

I do not claim as of my invention either a socketed cross-head by itself or a binder having the two ends united through an intervening piece, so that a single fastening will hold it in place; nor do I claim fastening the binder upon a shaft between the handle and socketed cross-bar; but I do claim—

1. The combination of a socketed cross-head with a binder, having the two ends thereof united directly to each other, the combination being substantially such as described.

2. The combination of a socketed cross-head with a binder, having the two ends thereof united directly to or with each other, and a single fastening for holding the whole binder directly to the handle itself, in such position as to clamp rags, &c., the combination being substantially as described.

3. The combination of a socketed cross-head with a handle and a binder, having the two ends thereof united to or with the handle itself, the combination being substantially such as described.

4. The combination of a cross-head with a handle and a binder, having the two ends thereof united directly together, and secured in clamping position on the handle proper, so as to sustain or aid in sustaining the cross-head, the combination being substantially such as set forth.

HARVEY MURCH.

Witnesses:

E. J. DURANT,

A. COLLINS.